US010917535B2

(12) United States Patent
Yoshidome

(10) Patent No.: US 10,917,535 B2
(45) Date of Patent: Feb. 9, 2021

(54) SCANNING SYSTEM WITH AUTOMATIC FILE FOLDER REFILER

(71) Applicant: Kyocera Document Solutions Inc., Osaka (JP)

(72) Inventor: Gin Yoshidome, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/455,521

(22) Filed: Jun. 27, 2019

(65) Prior Publication Data
US 2020/0412885 A1    Dec. 31, 2020

(51) Int. Cl.
| | | |
|---|---|---|
| H04N 1/00 | (2006.01) | |
| B42F 7/00 | (2006.01) | |
| B65H 39/10 | (2006.01) | |
| B65H 29/46 | (2006.01) | |
| B65H 29/12 | (2006.01) | |
| B42F 21/02 | (2006.01) | |

(52) U.S. Cl.
CPC ............ *H04N 1/0061* (2013.01); *B42F 7/00* (2013.01); *B65H 29/12* (2013.01); *B65H 29/46* (2013.01); *B65H 39/10* (2013.01); *H04N 1/00591* (2013.01); *H04N 1/00615* (2013.01); *H04N 1/00639* (2013.01); *B42F 21/02* (2013.01)

(58) Field of Classification Search
None
See application file for complete search history.

(56) References Cited

U.S. PATENT DOCUMENTS

| | | | | | |
|---|---|---|---|---|---|
| 3,786,931 | A | * | 1/1974 | Housholder | G06K 21/02 211/40 |
| 4,183,779 | A | * | 1/1980 | Barber | B42F 21/00 156/361 |
| 4,219,296 | A | * | 8/1980 | Fujii | G06K 17/0012 414/273 |
| 4,733,985 | A | * | 3/1988 | Moosmuller | B42F 13/16 402/27 |
| 4,749,121 | A | * | 6/1988 | Barber | B31F 1/0029 229/67.1 |
| 4,942,482 | A | | 7/1990 | Kakinuma et al. | |
| 5,308,058 | A | * | 5/1994 | Mandel | B65H 39/11 271/289 |
| 5,358,238 | A | * | 10/1994 | Mandel | B65H 31/24 101/2 |
| 5,404,805 | A | * | 4/1995 | Fujimoto | B65H 29/242 101/118 |

(Continued)

*Primary Examiner* — Anh-Vinh T Nguyen
(74) *Attorney, Agent, or Firm* — James Judge

(57) ABSTRACT

A scanner for inserting a sheaf of papers into a file folder, which includes a first roller, a second roller, a third roller, and a fourth roller, each roller attached to a frame of the scanner, a first paper guide and a second paper guide attached to the frame of the scanner, a folder lifter attached to the frame of the scanner, a conveyor belt attached to the frame of the scanner, and a control circuit configured to control the scanner, where the first roller and the second roller are configured to feed a file folder toward the first paper guide, the first paper guide is configured to guide it toward the third and fourth rollers, where the first paper guide further guides the file folder onto the folder lifter, and the third and fourth rollers are configured to feed the file folder toward the second paper guide.

19 Claims, 17 Drawing Sheets

(56) References Cited

U.S. PATENT DOCUMENTS

| | | | |
|---|---|---|---|
| 5,612,791 A | 3/1997 | Turner et al. | |
| 5,640,252 A | 6/1997 | Turner et al. | |
| 5,798,841 A | 8/1998 | Takahashi | |
| 6,736,924 B1 | 5/2004 | Janssen, Jr. | B42C 7/002 156/221 |
| 9,514,394 B2* | 12/2016 | Hara | G06K 9/342 |
| 9,695,006 B1* | 7/2017 | Yoshidome | B26D 1/065 |
| 10,666,827 B1* | 5/2020 | Yoshidome | H04N 1/00474 |
| 10,674,024 B1* | 6/2020 | Yoshidome | H04N 1/00543 |
| 10,674,026 B1* | 6/2020 | Yoshidome | H04N 1/0066 |
| 10,701,228 B1* | 6/2020 | Yoshidome | H04N 1/00628 |
| 10,701,232 B1* | 6/2020 | Yoshidome | H04N 1/00968 |
| 10,757,289 B1* | 8/2020 | Yoshidome | H04N 1/1026 |
| 10,778,858 B2* | 9/2020 | Fielding | H04N 1/00588 |
| 2002/0190019 A1* | 12/2002 | Reddig | B42F 15/0082 211/162 |
| 2003/0146559 A1* | 8/2003 | Middelberg | B65H 39/06 271/9.01 |
| 2003/0222396 A1* | 12/2003 | Kurahashi | B65H 39/00 271/207 |
| 2004/0036901 A1* | 2/2004 | Nakane | H04N 1/00795 358/1.13 |
| 2004/0131390 A1* | 7/2004 | Kita | G03G 15/0886 399/258 |
| 2004/0190057 A1* | 9/2004 | Takahashi | G06F 3/1275 358/1.15 |
| 2006/0026927 A1* | 2/2006 | Stemmle | B43M 3/045 53/429 |
| 2006/0033262 A1* | 2/2006 | Stemmle | B65H 9/04 271/258.01 |
| 2006/0197825 A1* | 9/2006 | Mohri | G03G 21/1892 347/240 |
| 2006/0220307 A1* | 10/2006 | Lyga | B65H 29/60 271/279 |
| 2007/0127084 A1* | 6/2007 | Hayashi | G06Q 10/02 358/403 |
| 2007/0156705 A1* | 7/2007 | Tsuya | H04N 1/00973 |
| 2007/0188794 A1* | 8/2007 | Matsui | B65H 5/00 358/1.15 |
| 2007/0285712 A1* | 12/2007 | Komada | H04N 1/00244 358/1.15 |
| 2008/0150215 A1* | 6/2008 | Farmer | B65H 3/446 271/1 |
| 2009/0148178 A1* | 6/2009 | Do | G03G 15/5083 399/82 |
| 2009/0157909 A1* | 6/2009 | Mozdzer | G05B 19/042 710/11 |
| 2011/0046775 A1* | 2/2011 | Bailey | B07C 3/02 700/224 |
| 2012/0099167 A1* | 4/2012 | Ciardullo | H04N 1/19594 358/498 |
| 2013/0003148 A1* | 1/2013 | Kani | H04N 1/2166 358/505 |
| 2013/0038911 A1* | 2/2013 | Asuri | H04N 1/00944 358/474 |
| 2014/0019980 A1* | 1/2014 | George | G06F 9/4843 718/102 |
| 2014/0071469 A1* | 3/2014 | Ishikawa | H04N 1/00551 358/1.12 |
| 2014/0123525 A1* | 5/2014 | Payne | B42F 21/00 40/359 |
| 2016/0292174 A1* | 10/2016 | He | G06F 16/13 |
| 2016/0325933 A1* | 11/2016 | Stiernagle | B65H 1/0457 |
| 2016/0325934 A1* | 11/2016 | Stiernagle | G07F 11/165 |
| 2017/0121136 A1* | 5/2017 | Ohmori | B41J 11/0095 |
| 2017/0322561 A1* | 11/2017 | Stiernagle | B65G 1/04 |
| 2018/0239839 A1* | 8/2018 | Yu | G06F 16/162 |
| 2018/0288272 A1* | 10/2018 | Yamamoto | H04N 1/2158 |
| 2019/0109950 A1* | 4/2019 | Horcher | B65G 43/00 |
| 2020/0042260 A1* | 2/2020 | Kanamoto | G06F 3/1253 |
| 2020/0084331 A1* | 3/2020 | Hall | H04N 1/00734 |
| 2020/0225655 A1* | 7/2020 | Cella | G05B 19/41875 |
| 2020/0236229 A1* | 7/2020 | Kumagai | H04L 67/06 |

* cited by examiner

SCANNING SYSTEM WITH AUTOMATIC FILE FOLDER REFILER

FIELD OF THE INVENTION

The present disclosure relates to a scanning system which is capable of refiling documents into a file folder, after scanning them.

BACKGROUND

Currently, when documents are stored in a file folder and a user wishes to scan, copy, etc., the documents in the file folder, a person must manually remove the documents from the file folder in order to process the documents using a scanner, and then manually return the documents to the file folder after processing. A scanner can perform processes such as scanning, faxing, and copying. While removing and then refiling documents in a file folder for one file can be inconvenient, repeating this process hundreds or thousands of times can be very tedious and time consuming.

For example, if a company is digitizing paper records and wishes to scan thousands of documents and files, it can cost substantial amounts of time and money to manually de-folder and then folder papers after scanning. Automating the re-foldering process could greatly increase the efficiency and throughput of digitizing documents with a scanner.

An example of a related art de-foldering system is shown in FIG. 1. Here FIG. 1 shows a side view of a paper removal, or de-foldering, system 100 as could be employed with the present disclosure. From this perspective, the system can be seen to include a roller 20, and a roller 40. Thus, in conjunction with such a de-foldering system 100, using a re-foldering system could improve the efficiency and capability of using a scanner.

SUMMARY

It is noted that the term scanner can also refer to a printer, copy machine, etc., or combination thereof, suitable for use in either a home or office.

According to an embodiment of the disclosure, a scanner for inserting a sheaf of papers into a file folder includes: a first roller, a second roller, a third roller, and a fourth roller, each roller being attached to a frame of the scanner; a first paper guide and a second paper guide attached to the frame of the scanner; a folder lifter attached to the frame of the scanner; a conveyor belt attached to the frame of the scanner; and a control circuit configured to control the scanner. The first roller and the second roller are configured to feed a file folder toward the first paper guide; the first paper guide is configured to guide it toward the third and fourth rollers; the first paper guide further guides the file folder onto the folder lifter; the third and fourth rollers are configured to feed the file folder toward the second paper guide; and the second paper guide is configured to guide the file folder around the fourth roller, so that a side of the file folder is positioned in between the fourth roller and the conveyor belt.

BRIEF DESCRIPTION OF THE DRAWINGS

The following drawings illustrate examples of various components of embodiments of the disclosure disclosed herein and are for illustrative purposes only.

DETAILED DESCRIPTION

The inventor has created a method and apparatus for filing documents in folders. In one embodiment, a folder to hold documents is moved into position by two rollers. The first roller will move the folder across a folder lifter. Subsequently, two other rollers will guide the file folder into the ready state for receiving a sheaf of papers. Once in the ready state, one of the subsequent rollers will retract and the folder lifter will rise such that the folder is opened. Then a paper pushing assembly including a paper tray, loaded with a sheaf of papers, and a paper pusher will move into place and the paper pusher will push the sheaf of papers into the file folder. The file folder is then loaded onto a conveyor and moved to the next stage of processing.

In certain embodiments, the folder may have held the same sheaf of papers earlier in processing and so the sheaf of papers is being returned to the original file folder.

The system can be internally contained within a scanner, or can be a separate unit in a printing system. For example, the system could be connected to a scanner and could process papers that have been previously processed by the scanner.

The figures are not necessarily shown to scale and some features may be shown larger or smaller than they are with respect to other features in order to facilitate their explanation.

Figure 2:
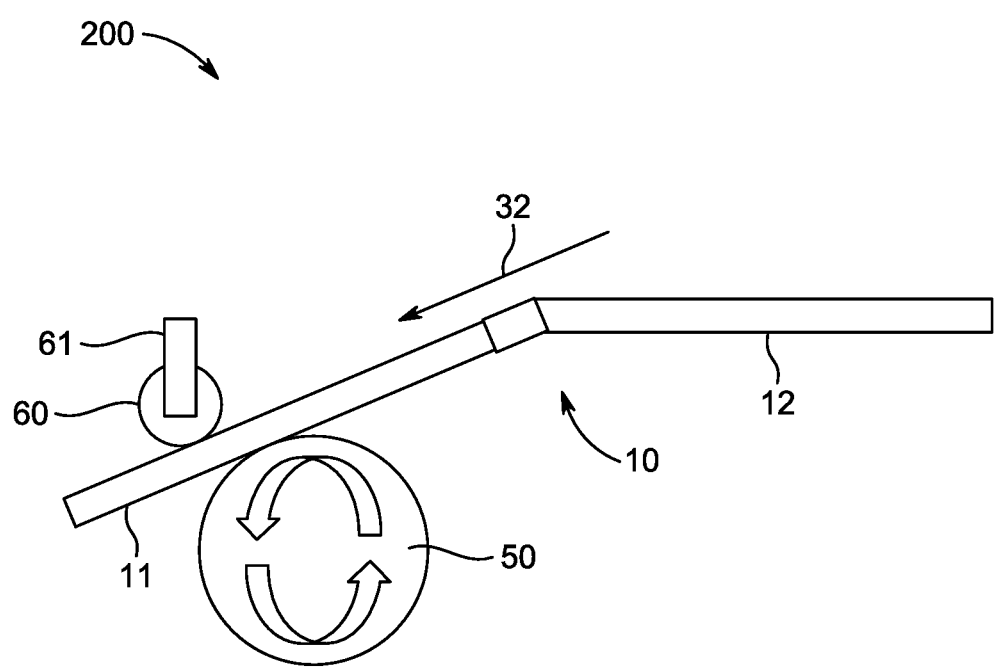
FIG. 2 shows a side view of the apparatus for opening a file folder for receiving a sheaf of papers in one embodiment of the disclosure.

FIG. 2 shows the side view of the system 200 for opening file folder 10 for receiving sheaf of papers 30 in one embodiment of the disclosure.

Figure 1:
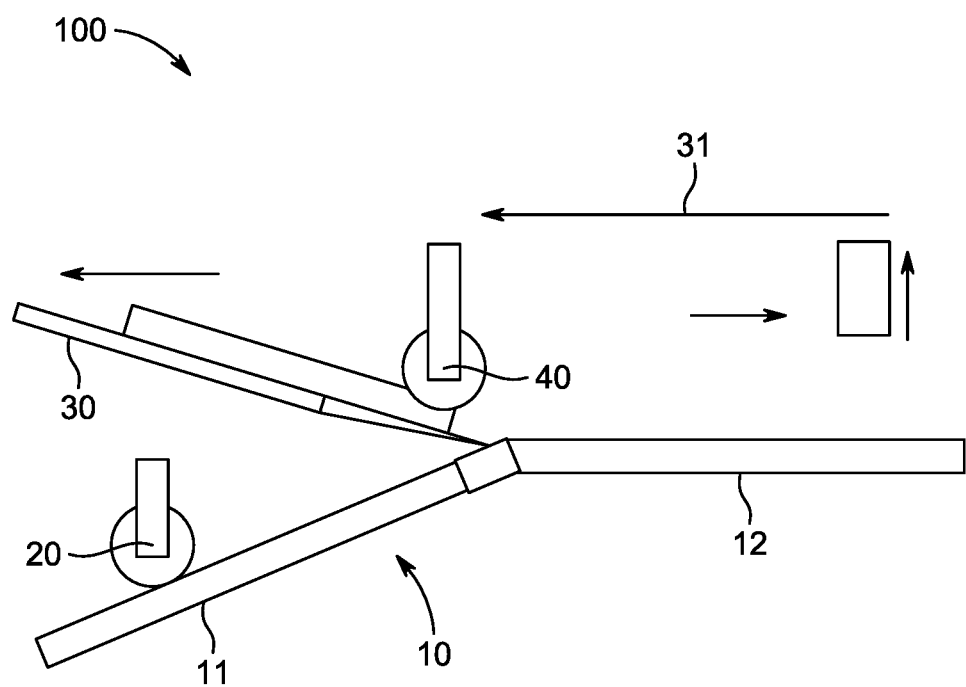
FIG. 1 shows a side view of a sheaf of papers removal, or de-foldering, process according to related art.

This may occur after sheaf of papers 30 has been scanned or otherwise processed, as discussed in FIG. 1 for example. Depending on system specifications, sheaf of papers 30 may have been removed for scanning from the same file folder 10. Alternatively, sheaf of papers 30 may have been removed from a separate file folder prior to scanning or other processing by the scanner. In another embodiment, sheaf of papers 30 has been created (e.g. via printing or facsimile request) and is being placed in file folder 10 from a file folder storage (not shown).

File folder 10 could include any file folder compatible with and capable of being processed by a scanner. For example, file folder 10 could be made of paper stock, plastic, or other material. Similarly, file folder 10 could include tabs of any size, including for example $\frac{1}{3}^{rd}$ cut or $\frac{1}{5}^{th}$ cut. An exemplary file folder could be a commonly known manila folder.

Paper sheaf 30 could include any paper compatible with and capable of being processed by a scanner. For example, paper sheaf 30 could be comprised of one or more sheets of 8.5×11 inch 20-pound bond weight paper. Similarly, paper sheaf 30 could be comprised of sheets of different sized paper, i.e. 8.5×14 inch, or different weights, i.e. 36-pound bound paper. Paper sheaf 30 could also include an ISO 216 size paper, or any other suitable size or weight of paper.

From the side view of system 200 shown in FIG. 2, it can be seen that after file folder 10 is loaded into position, either by human intervention or by mechanical means such as a conveyor belt, a movable tray or the like (not shown), roller 50 and roller 60 process file folder 10 in the direction of file folder feed 32. This process can be initiated, for example, after the de-foldering process referred to above in FIG. 1.

Figure 13:
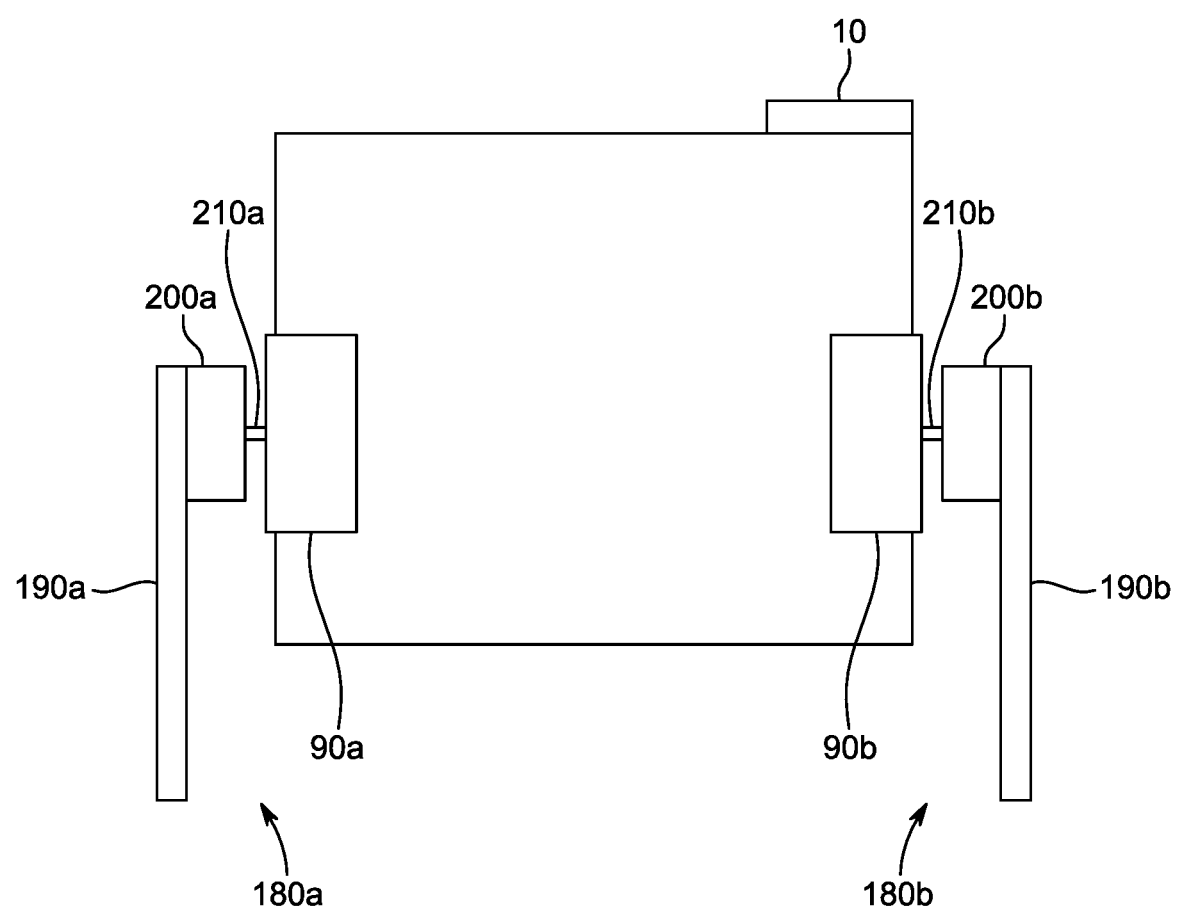
FIG. 13 shows a plan view with rollers positioned inside the file folder of the apparatus for opening a file folder for receiving a sheaf of papers in one embodiment of the disclosure.
Figure 14:
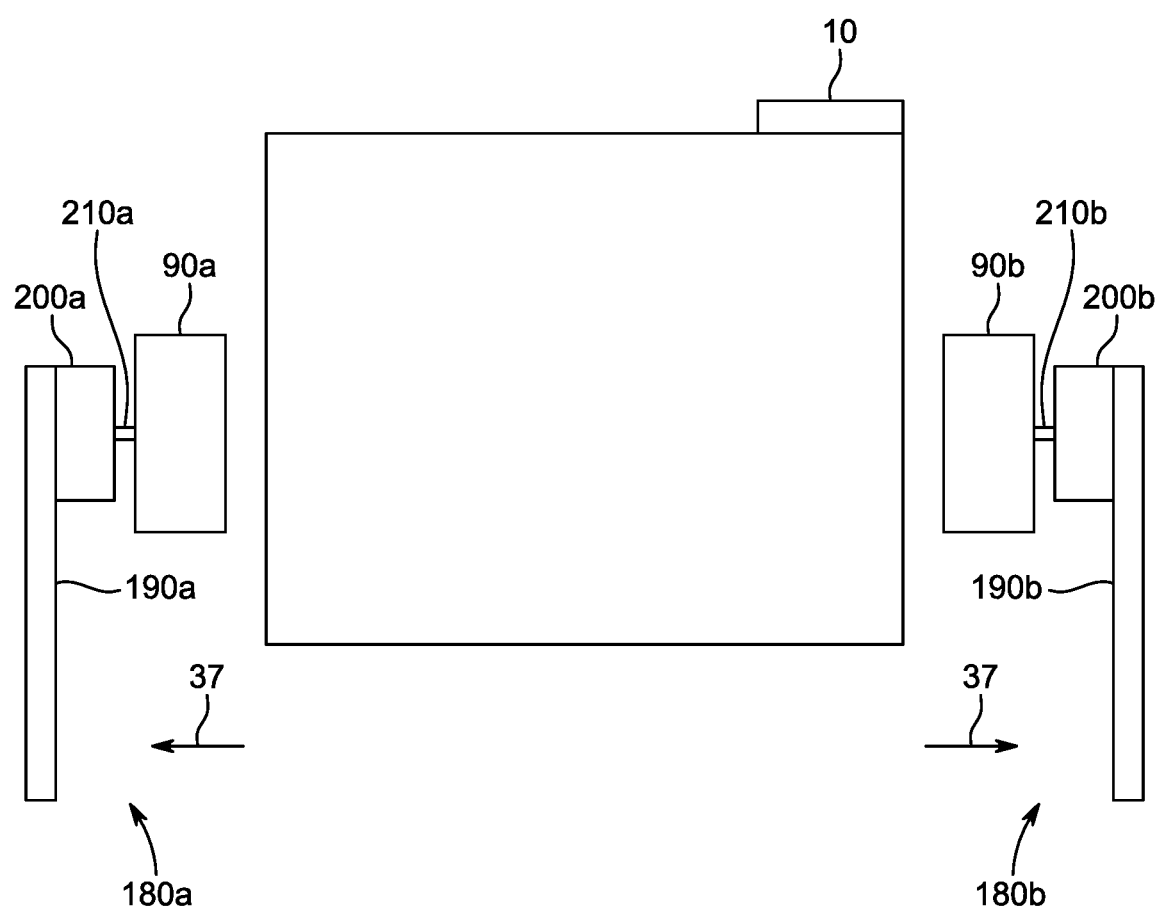
FIG. 14 shows a plan view with rollers positioned outside of the file folder of the apparatus for opening a file folder for receiving a sheaf of papers in one embodiment of the disclosure.

Roller 60, as depicted, is cylindrical, though depending on system specifications could be other shapes as well, such as circular or oblong. For example, roller 60 may be a single long cylinder which extends over a portion or all of file folder 10. Alternatively, as shown in FIGS. 13-14, roller 60 may be two smaller rollers located on either side of file folder 10. Accordingly, although the description may reference a single roller, such as rollers 50, 60, 80 and 90, it is understood that a single roller could instead be two or more rollers. Additionally, with regard to dimensions, roller 60 may be any dimension necessary to fit the system, so long as it is capable of directing sheaf of papers 30. Roller 60 may be formed of any elastically deformable material, or have such an outer coating in order to effectively grip and move paper. Roller 60 is connected to the system 100 via arm 61, which can be ultimately connected to the scanner frame, or a separate body/frame, which can connect to a scanner. As will be discussed below with regard to an exemplary roller movement assembly 180a, the position of roller 60 is adjusted by arm 61 can be driven by any means, including, for example, an electric motor or solenoid, or other type of movement mechanism. The position of roller 60 and arm 61 can be controlled by a control circuit 1500 as will be discussed below.

If not expressly discussed below, the characteristics of roller 60, including its dimensions, materials, position adjustment, and control means will equally apply to all rollers discussed below. Similarly, although it may not be depicted or discussed with regard to each figure or embodiment, it is envisioned that each roller is attached to an arm, or other similar device, for controlling the position of the roller.

Roller 50 is positioned underneath the outer portion of side 11 of file folder 10, i.e. the portion that does not contact paper sheaf 30, and is designed to be an outside of the file folder. Roller 50 rotates in the direction of file folder feed 32. In FIG. 2, this rotation is depicted as counter-clockwise, though the direction may change depending on the system configuration. Roller 60 is positioned on the inner portion of side 11 and is driven in the direction of file folder feed 32 thereby opening file folder 10. Here, opening the file folder 10 refers to the file folder being a single sheet and not being folded over. Rollers 50 and 60 are positioned such that a suitable amount of space exists between the rollers so as to apply a pressure to the file folder 10 sufficient for gripping and moving it. To accomplish this, the roller arms (not shown), holding the rollers, could be spring-loaded so as to apply a proper amount of force on the opposite roller, or the roller arms could be movable by a movement means such as a motor, solenoid, etc.

Figure 3A:
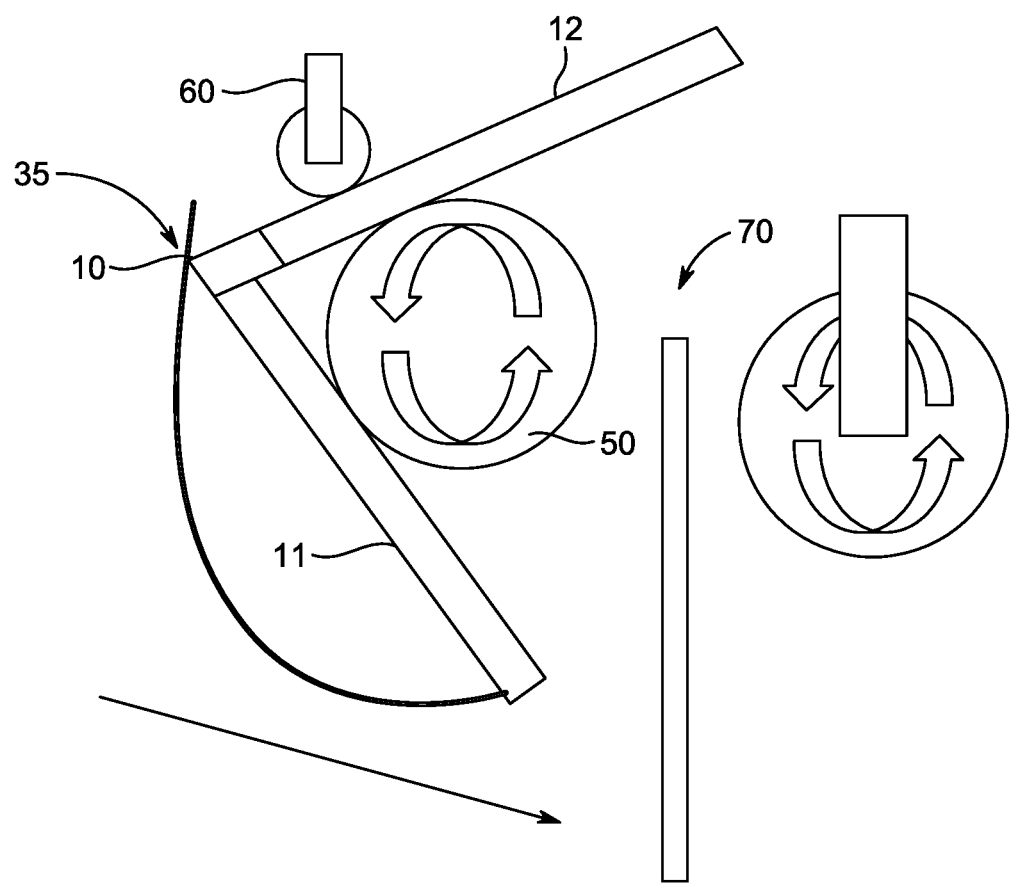
FIG. 3A shows a side view of the apparatus for opening a file folder for receiving a sheaf of papers in one embodiment of the disclosure

FIG. 3A shows the side view of a system for preparing file folder 10 for receiving sheaf of papers 30 in one embodiment. As shown in FIG. 3A, rollers 50 and 60 process file folder 10, causing the file folder 10 to impact the paper guide 35. Paper guide 35 is curved in order to guide the file folder 10 in a downward direction when the file folder 10 strikes it. Further, paper guide 35 is configured so that the file folder 10 is fed around the roller 50 and in some embodiments, the file folder 10 could be pressed against the side/bottom of roller 50. From this perspective it can be seen that roller 50 will rotate and move file folder 10 across/above folder lifter 70, as later shown in FIG. 4.

As will be discussed below, folder lifter 70 may have different structures depending on system requirements, but from the side perspective of FIG. 3A, only one piston assembly 140 (shown in FIG. 11) of folder lifter 70 can be seen. In an embodiment of the disclosure, folder lifter 70 includes a wire 71 attached near the bottom proximal end of piston assembly 150 (shown in FIG. 11) that runs into the page and is attached to another piston assembly 140 (shown in FIG. 11), which is substantially similar and parallel to piston assembly 140 at its other end.

Figure 4:
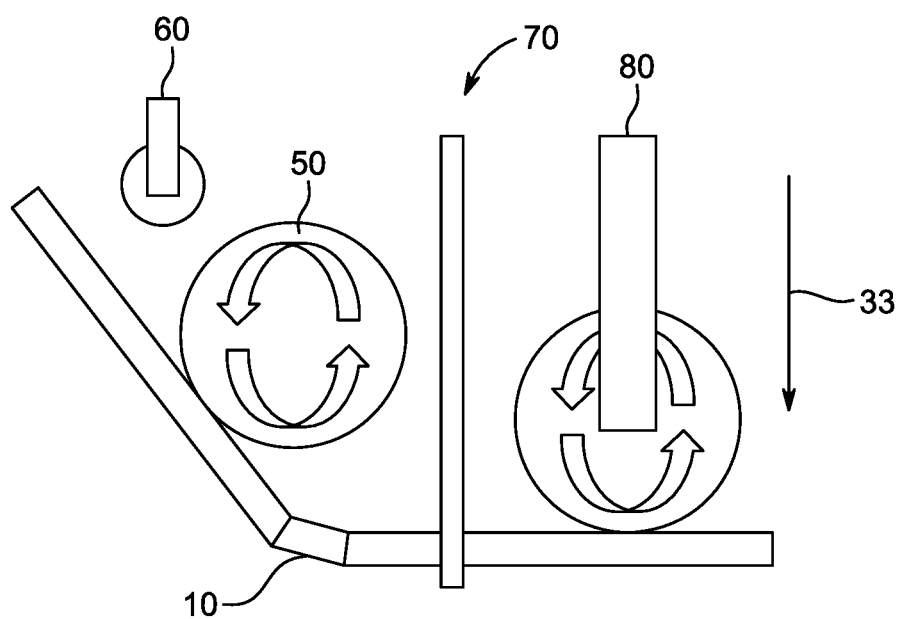
FIG. 4 shows a side view of the apparatus for opening a file folder for receiving a sheaf of papers in one embodiment of the disclosure.

As depicted, roller 50 rotates in a counter-clockwise direction (though the direction may change depending on system requirements) and file folder 10 is moved between rollers 60 and 50 and until it is resting on the wire 71 of folder lifter 70, as indicated in FIG. 4 (although wire 71 doesn't appear in the FIG. 4 view). Specifically, paper guide 35 curves around the outer portion of file folder 10 to guide file folder 10. In this embodiment, as file folder 10 is driven between rollers 60 and 50 by the rotation of roller 50, side 11 of file folder 10 is driven against paper guide 35 and is then propelled along the inner circumference of paper guide 35 toward folder lifter 70. Meanwhile, the hinge portion of file folder 10 bends such that file folder 10 rotates around roller 50.

Paper guide 35 may be made of any substantially non-deformable and rigid material, such as aluminum, steel, plastic, etc. While paper guide 35 is depicted as an arc, it is envisioned that paper guide 35 could be any shape sufficient to guide file folder 10 into position. For example, paper guide 35 could simply be slanted, or parabolic, etc., as long as it is capable of guiding file folder 10 into position.

Figure 3B:
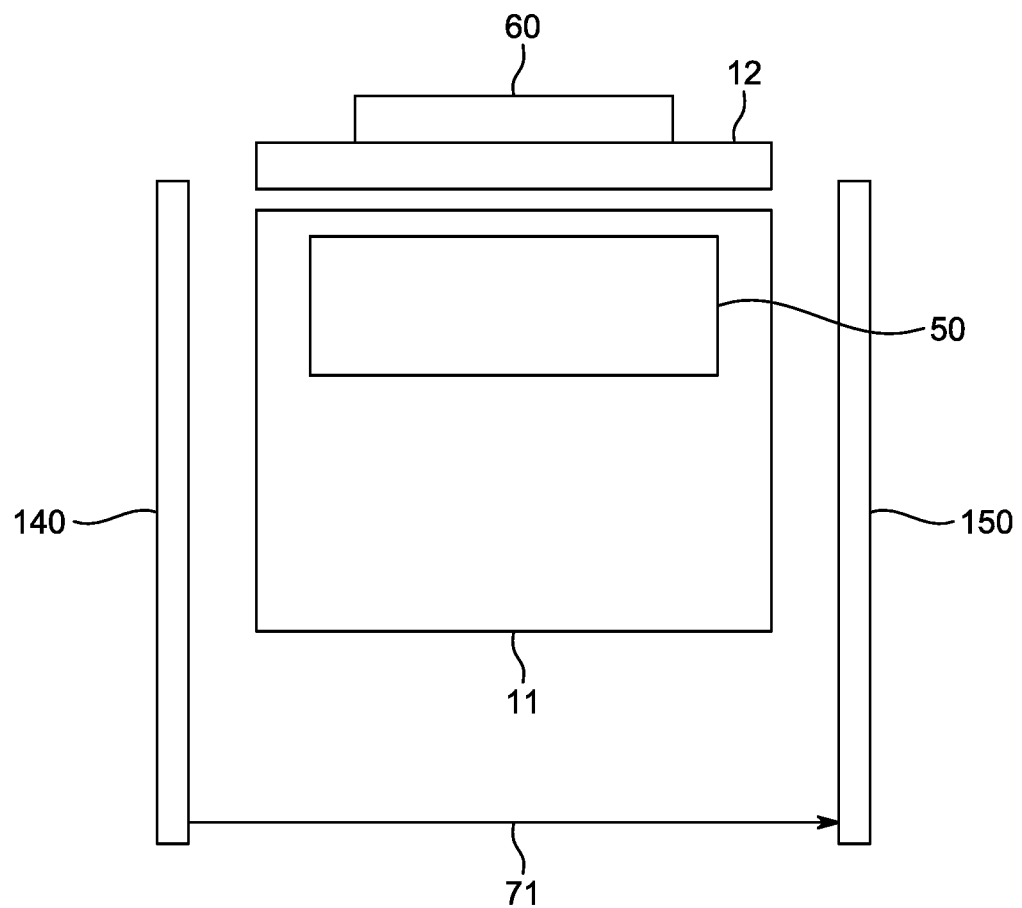
FIG. 3B shows a front view of the apparatus for opening a file folder for receiving a sheaf of papers in one embodiment of the disclosure.

FIG. 3B is a front view of the system 300 shown in FIG. 3A. From this perspective, the alignment of paper guide 35, file folder 10, roller 50, and the details of folder lifter 70 can be seen.

Figure 5:
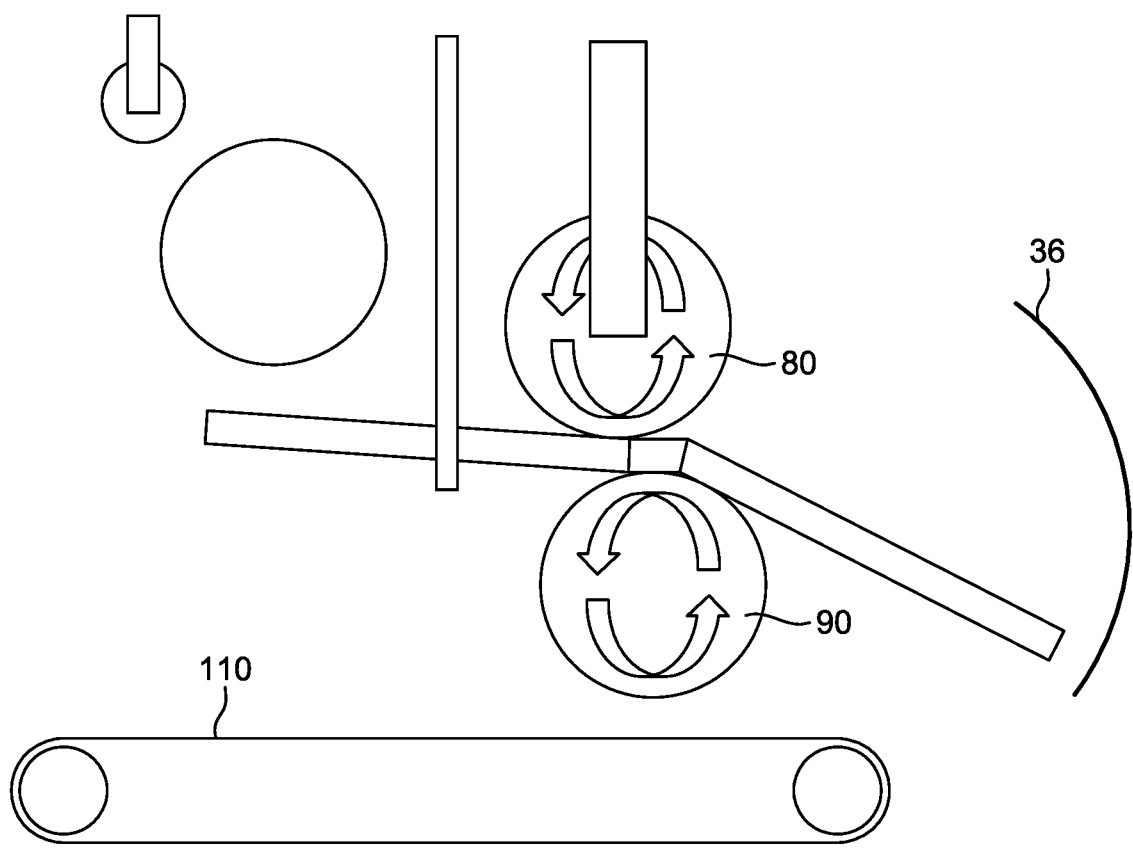
FIG. 5 shows a side view of the apparatus for opening a file folder for receiving a sheaf of papers in one embodiment of the disclosure.

As shown in FIG. 4, rollers 50 and 80 then guide file folder 10 into the next processing step. In this embodiment, roller 80 moves in direction 33, thereby applying a downward force on file folder 10. As shown in FIG. 5, file folder 10 is securely held between roller 80 and roller 90. This additional pressure applied by rollers 80 and 90 allows for improved control and movement of file folder 10. As will be discussed below, the mechanism for moving the rollers can include, for example, a motor(s) and shafts attached to the arms connected to the rollers, and can further include a spring to apply the correct amount of force to the folder and the opposite roller.

Figure 6:
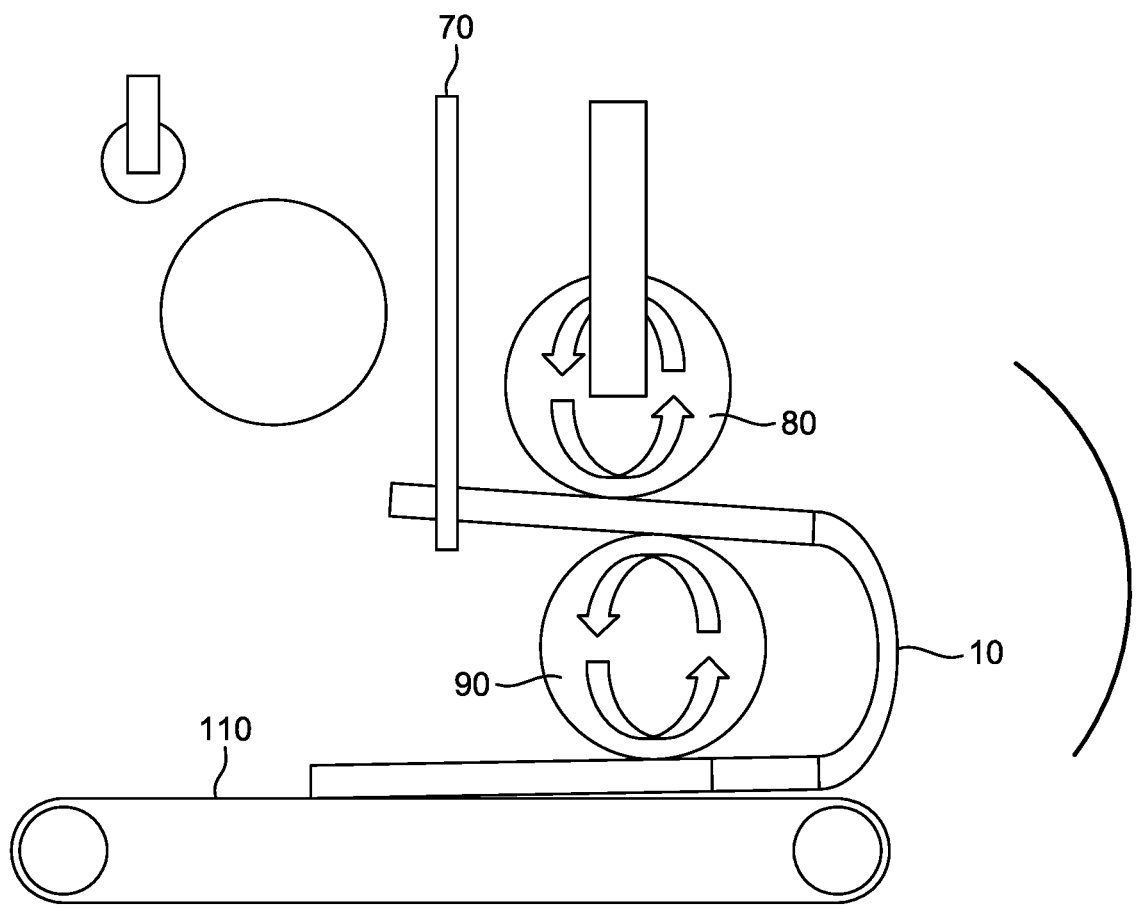
FIG. 6 shows a side view of the apparatus for opening a file folder for receiving a sheaf of papers in one embodiment of the disclosure.

In FIGS. 5 and 6, file folder 10 is positioned in the "Ready State" for receiving a paper sheaf. In the depicted embodiment, roller 80 rotates in a counter-clockwise direction while roller 90 rotates in a clockwise direction. By rotating in these directions, file folder 10 is driven by rollers 80 and 90 against paper guide 36 and around roller 90, and onto conveyor belt 110. In some embodiments, while, or after, file folder 10 has rotated around roller 90, folder lifter 70 will retract upwards thereby opening file folder 10. Folder lifter 70 moves upwards far enough that paper sheaf 30 can be pushed into file folder 10 (discussed below) but not so far that file folder 10 will fall off of folder lifter 70. As will be discussed below, there are several mechanisms that can be used to position folder lifter 70.

Paper guide 36 is substantially similar to paper guide 35, though it guides file folder from between roller 80 and 90, around roller 90, and onto conveyor belt 110.

Although the above description discloses certain embodiments of the disclosure, it is understood that the file folder may be moved to the Ready State in various ways. For example, the number, orientation, rotational direction, and size of the rollers may be adjusted for system configuration. Similarly, the means of file folder movement may be accomplished without rollers, including, for example, by a clamping assembly driven by an electric motor or solenoid, or other type of movement mechanism (not shown), or the file folder may be placed into the Ready State by direct human interaction.

Figure 7:
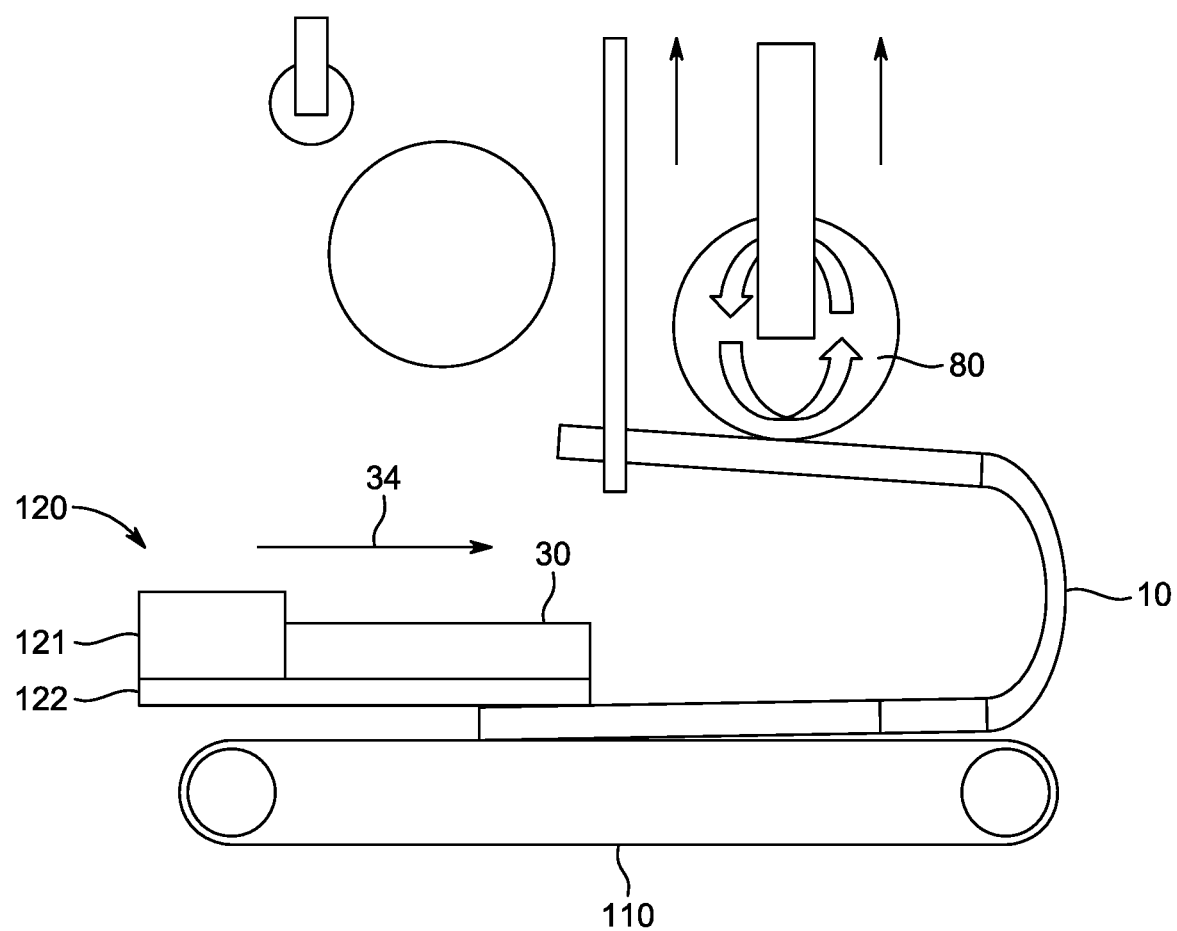
FIG. 7 shows a side view of the apparatus for opening a file folder for receiving a sheaf of papers in one embodiment of the disclosure.
Figure 8:
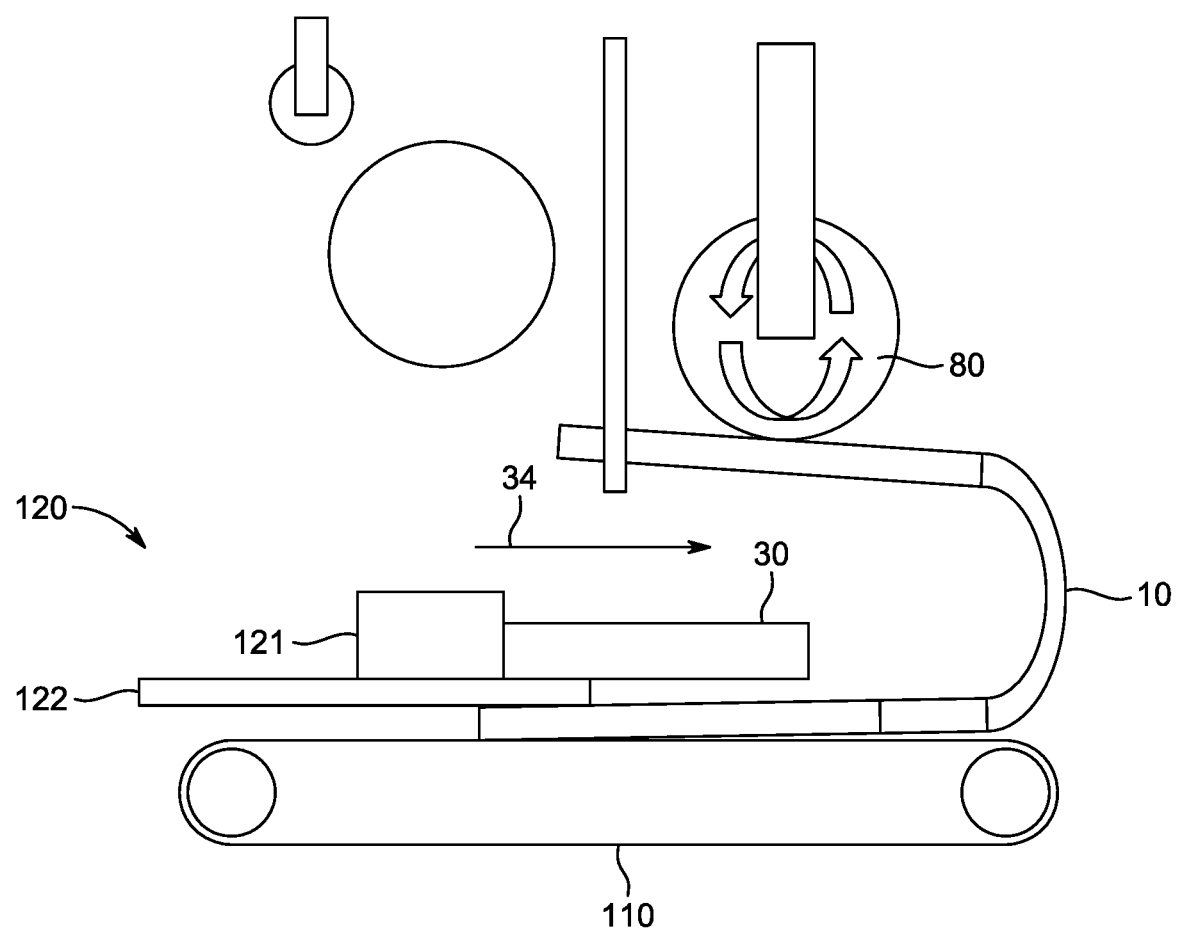
FIG. 8 shows a side view of the apparatus for opening a file folder for receiving a sheaf of papers in one embodiment of the disclosure.
Figure 9:
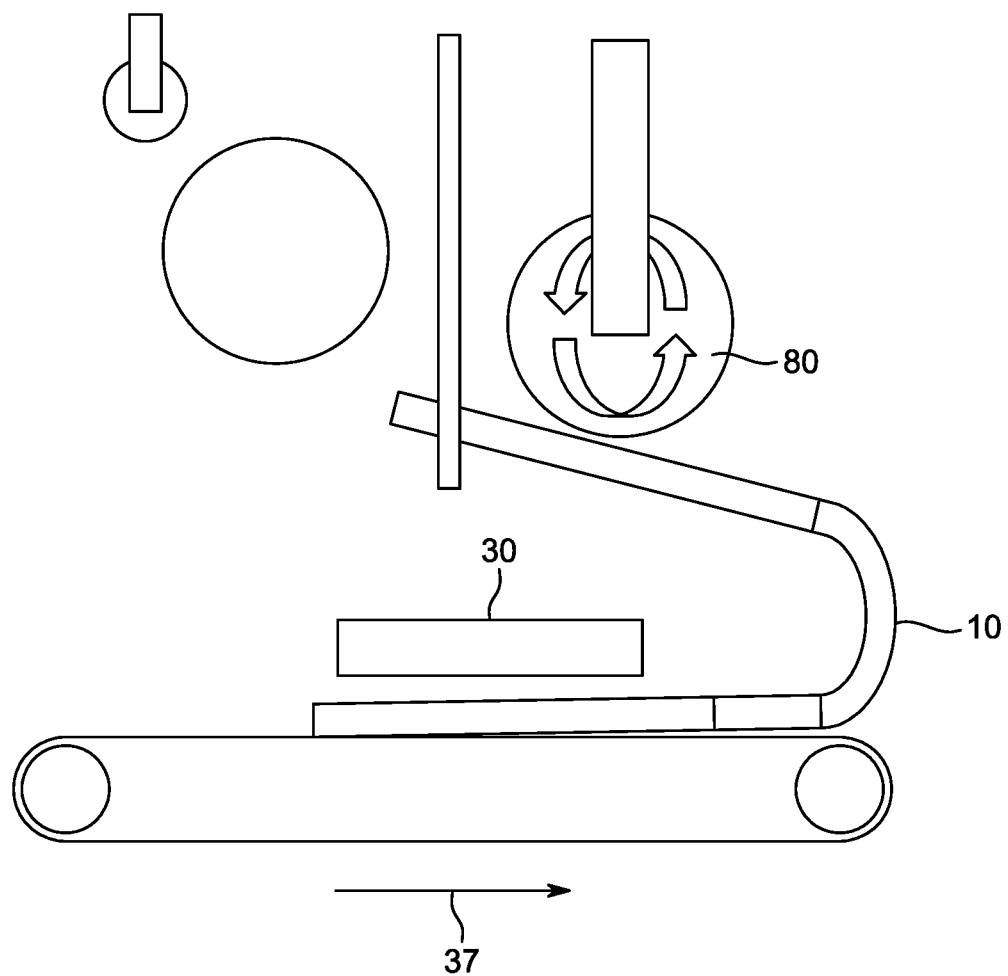
FIG. 9 shows a side view of the apparatus for opening a file folder for receiving a sheaf of papers in one embodiment of the disclosure.

Once in the Ready State, the file folder 10 is ready for paper sheaf 30 insertion. As shown in FIGS. 7, 8, and 9, for example, paper sheaf 30 may be inserted into file folder 10 by a paper pusher assembly 120.

As depicted in FIG. 7, roller 90 retracts so as to avoid interference with paper sheaf 30. Roller 90 could retract orthogonally or laterally beyond the furthest edge of file folder 10, for example.

After roller 90 retracts, and as mentioned above, folder lifter 70 can optionally further open the file folder 10, shown in FIG. 9, for example. With the file folder held in the open position by the folder lifter 70, the paper pusher assembly 120 moves into a position for paper sheaf insertion. Paper pusher assembly 120 is capable of pushing paper sheaf 30 in direction 34 into file folder 10. As depicted, paper pusher assembly 120 includes a pushing mechanism 121 and a paper tray 122.

As shown in FIG. 7, the proximal end of paper tray 122 is positioned inside and in between sides 11 and 12 of the file folder 10 so that a pushing mechanism 121 can simply push the paper sheaf 30 into the file folder without the paper sheaf 30 becoming caught or snagged on an edge of the file folder 10.

As depicted in FIG. 7, paper tray 122 is a rectangular prism and includes a flat upper surface upon which paper sheaf 30 rests and is ultimately pushed into file folder 10, though the structure of paper tray 122 may be as needed by the system, as long as it includes a surface to support paper sheaf 30. Paper tray 122 must be capable of sufficiently supporting and stabilizing paper sheaf 30 throughout the process of folder insertion and therefore is preferably made from a rigid material such as aluminum, steel, plastic, etc.

As mentioned above, sheaf of papers 30 may have been scanned or otherwise processed and then placed either by mechanical means or human intervention onto paper tray 122. Depending on system specifications, sheaf of papers 30 may have been removed for scanning from the same file folder 10. Alternatively, sheaf of papers 30 may have been removed from a separate file folder prior to scanning or other processing by the scanner. In another embodiment, sheaf of papers 30 has been created (e.g. via printing or facsimile request).

Pushing mechanism 121 includes means for pushing paper sheaf 30 in pushing direction 34 into file folder 10. For example, pushing mechanism 121 could include a piston assembly (not shown) wherein a piston is extended from a housing and pushes paper sheaf 30 along paper tray 122 into file folder. The piston could be driven by various means including, for example, by a solenoid or pneumatic cylinder, depending on system speed, space, cost, or other constraints. The specific pushing mechanism, however, could be driven electrically, pneumatically, or driven by other means as needed to satisfy system design requirements.

Paper pushing assembly 120 may also include different configurations and components as needed for the system. For example, paper pushing assembly 120 may be a conveyor belt which drives and/or drops paper sheaf 30 into file folder 10.

Once paper sheaf 30 has been inserted into file folder 10, paper pusher assembly 120 retracts to its original position, returning to obtain the next paper sheaf, or otherwise retracts to avoid interfering with the next stages of processing.

Figure 10:
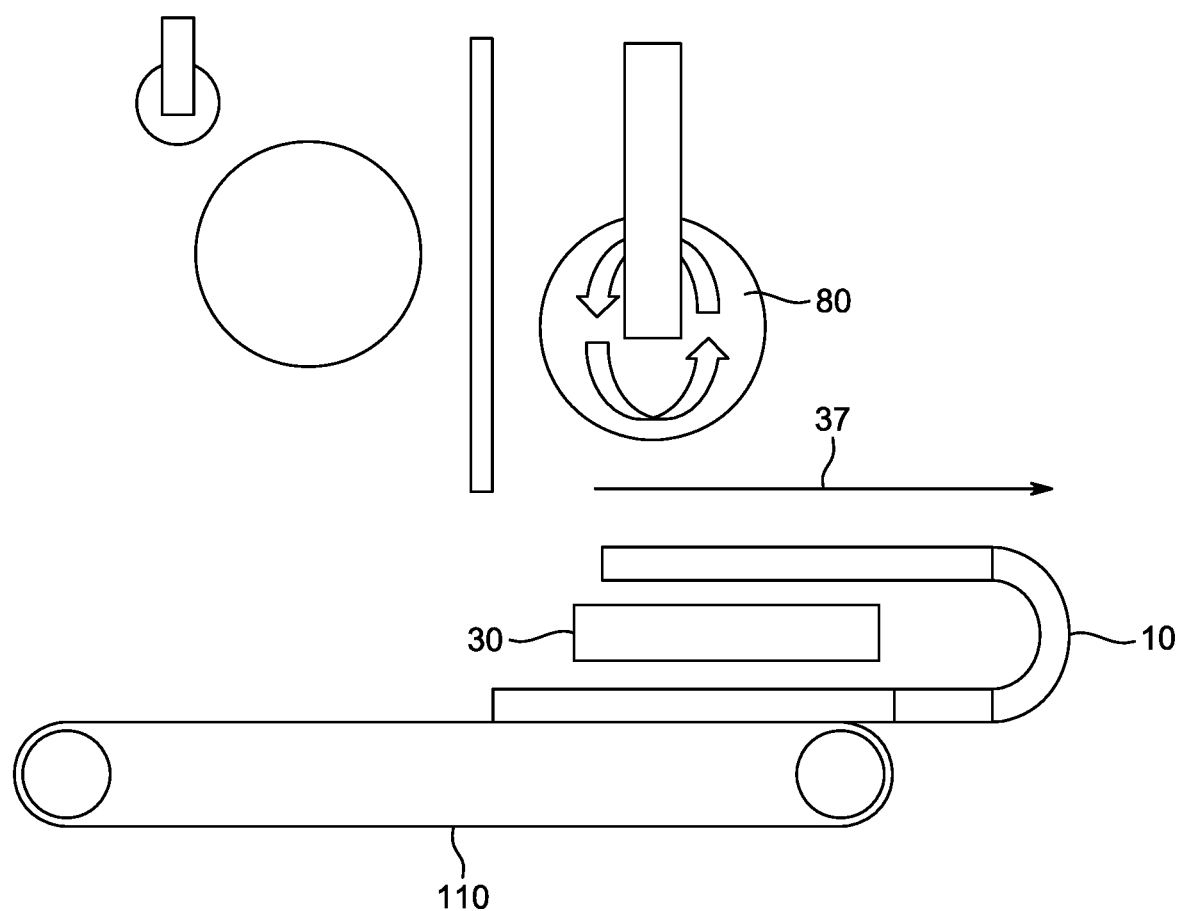
FIG. 10 shows a side view of the apparatus for opening a file folder for receiving a sheaf of papers in one embodiment of the disclosure.

Subsequently, as shown in FIG. 10, conveyor belt 110 then moves file folder 10 in direction 37 to the next stage of processing which could include, for example, a process to store file folder 10 in a binder (not shown) or clip file folder 10 with other documents and/or file folders with a binder clip (not shown). This could be accomplished by driving the conveyor belt 110 in the desired direction. By moving in direction 37, filer folder 10 will be pulled off of folder lifter 70 thereby closing file folder 10 through its own weight. However, it is also envisioned that folder lifter 70 may be extended toward conveyor belt 110 to close file folder 10 before the next stage of processing.

Additionally, in other embodiments, it is envisioned that file folder is then ejected from the scanner, or alternatively, positioned for ejection from the scanner.

While the above embodiments employ folder lifter 70 to open file folder 10 to receive paper sheaf 30, it is also envisioned that file folder 10 could be opened by other means. Further, in some embodiments, paper could be inserted into file folder 10 without opening file folder 10 with a folder lifter 70. For example, paper pushing assembly 120 could include an edge (not show) at the front of the assembly to slide between the sides of file folder 10 to allow for paper sheaf insertion. Alternatively, a separate opening mechanism (not shown) including a means for grabbing the side of file folder 10 could be employed to lift the side of file folder and open it to allow the paper sheaf 30 to be inserted.

Folder Lifter

Figure 11:
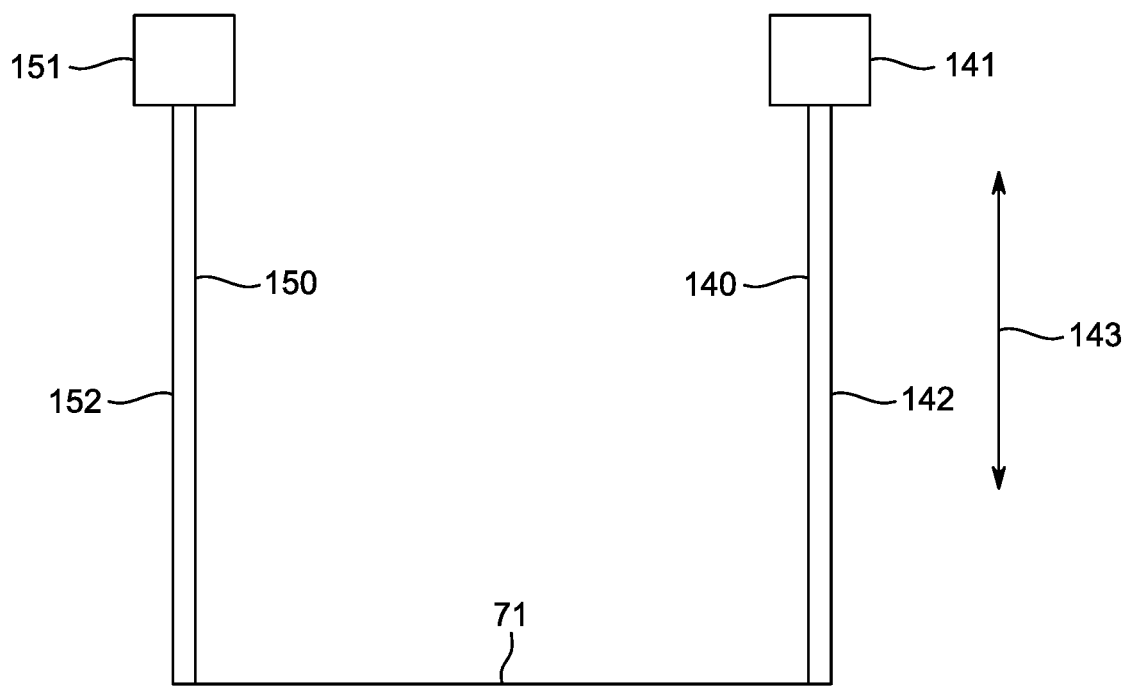
FIG. 11 shows a front view of a piston assembly according to a first embodiment of the disclosure.

FIG. 11 shows a side view of an exemplary folder lifter 70 according to one embodiment of the disclosure. As depicted, folder lifter 70 includes a wire 71 attached to the proximal ends thereof, and piston assemblies 140 and 150.

As depicted, piston assemblies 140 and 150 include piston housing mechanisms 141 and 151 as well as pistons 142 and 152. In this embodiment, pistons 142 and 152 are extended from piston housing mechanisms 141 and 151, moving in an up/down direction 143. Pistons 142 and 152 could be driven by various means including, for example, a solenoid or pneumatic cylinder, depending on system speed, space, cost, or other constraints. The specific pushing mechanism, however, could be driven electrically, pneumatically, or driven by other means as needed to satisfy system design requirements.

The piston assemblies 140 and 150 are configured to be driven at the same time and at the same rate so that the folder being lifted is lifted in an even and smooth manner.

Wire 71 may be comprised of any material capable of being suspended between piston assemblies 140 and 150 and supporting the weight of file folder 10 without substantially deforming in shape. Accordingly, wire 71 is preferably made from a relatively inelastic material such as aluminum, steel, plastic, or the like. The length of wire 71, which is also the same as the distance between pistons 140 and 150 must be at least wider than the width of the file folder being processed.

In other embodiments, folder lifter 70 could be comprised of different components and the components could be in different orientations. For example, folder lifter 70 could include only one piston assembly that is rigidly attached to a cross bar rather than a suspended wire.

Alternatively, folder lifter 70 could be positioned by a movement means including, for example, an electric motor, solenoid, or other type of movement mechanism (not shown).

Figure 12:
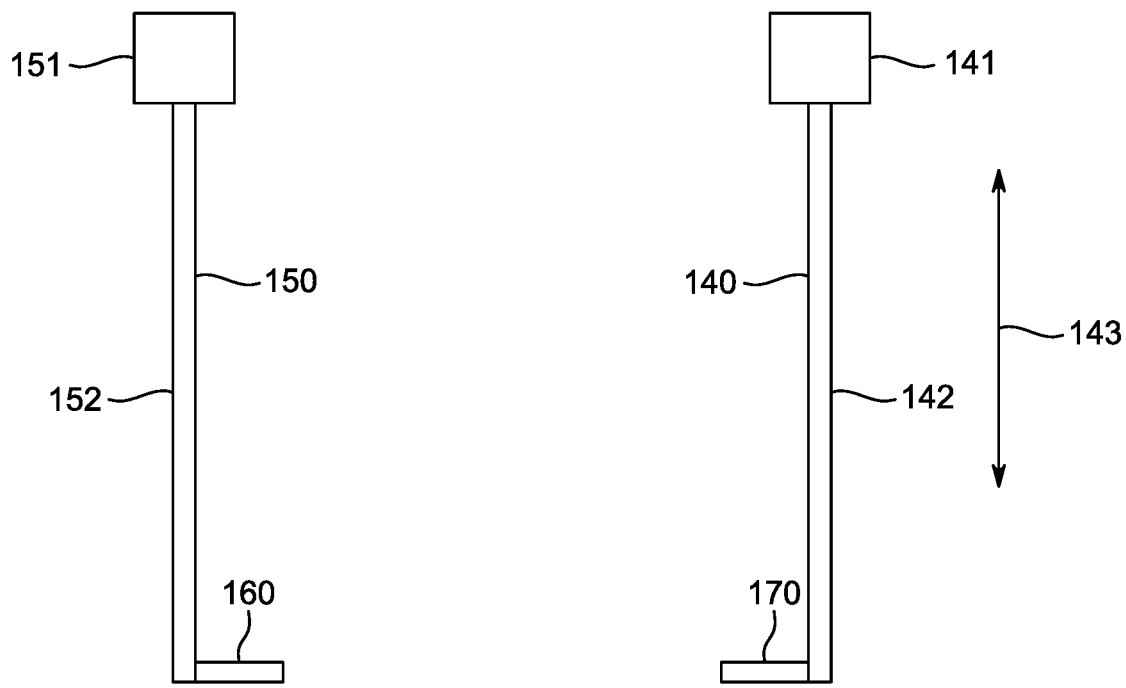
FIG. 12 shows a front view of a piston assembly according to a second embodiment of the disclosure.

FIG. 12 shows a side view of an exemplary folder lifter 70 according to another embodiment of the disclosure. In this embodiment, rather than using wire 71 to support file folder 10 as it is moved, paddles 160 and 170 are rigidly or movably attached to the proximal ends of pistons 142 and 152. These paddles 160 and 170 form a support structure and can be used in place of a wire 71 support structure. With this configuration, the middle portion of file folder 10 will rest on paddles 160 and 170, rather than wire 71, as folder lifter 70 positions file folder 10.

While the paddles 160 and 170 are depicted as rectangular prisms extending toward each other from pistons 142 and 152, the dimensions, including orientation, shape, and size of paddles 160 and 170 may be designed as needed to satisfy design requirements.

Additionally, paddles 160 and 170 may be made from any material sufficient to support file folder 10. Preferably, paddles 160 and 170 are made of a light, inexpensive, and substantially nondeformable material such as aluminum or plastic.

Roller Movement Assembly

FIGS. 13 and 14 show the top view of rollers 90a and 90b retracting after file folder 10 is in the ready state in an exemplary embodiment of the disclosure. FIGS. 13 and 14 depict the retraction of two exemplary motors, though it is envisioned that this process could be used for any number of rollers. Accordingly, the below description discloses the retraction of one exemplary roller. As discussed above, it is envisioned that two or more rollers could be used together, rather than a single roller. Similarly, it is also envisioned that the entire roller arm, rather than just the roller, could retract using similar methods. In such an embodiment, a motor and shaft could be located on the opposite side of the arm, with the motor connected to the scanner frame and the shaft connected to the arm.

From this perspective, exemplary roller movement assembly 180a for roller 90a in one embodiment of the disclosure can be seen. Roller movement assembly 180a includes an arm 190a, motor 200a, and shaft 210a. Shaft 210a is connected to motor 200a as well as roller 90a. Accordingly, motor 200a is capable of moving shaft 210a, and attached roller 90a, in forward and reverse direction 37, depending on whether roller 90a is being retracted or extended.

Motor 200a can be an AC or DC motor and can be a servo motor, stepper motor, linear motor, or the like. Alternatively, motor 200a could be any type of movement means necessary to satisfy design requirements including cost, space, speed, and reliability.

Arm 190a can be comprised of any material and be in any form necessary to support roller movement assembly 180a. Accordingly, shaft 210a is preferably a substantially non-deformable material such as aluminum or plastic.

Similarly, shaft 210a may be any material capable of being driven by motor 200a and moving roller 90a. Accordingly, shaft 210a is preferably a substantially non-deformable material such as aluminum, steel, plastic or the like.

As shown in FIG. 14, once motor 200a retracts roller 90a in direction 37, roller 90a is positioned outside of the perimeter of file folder 10 such that file folder 10 can move in a direction orthogonal to direction 37, without interference from roller 90a.

Figure 15:
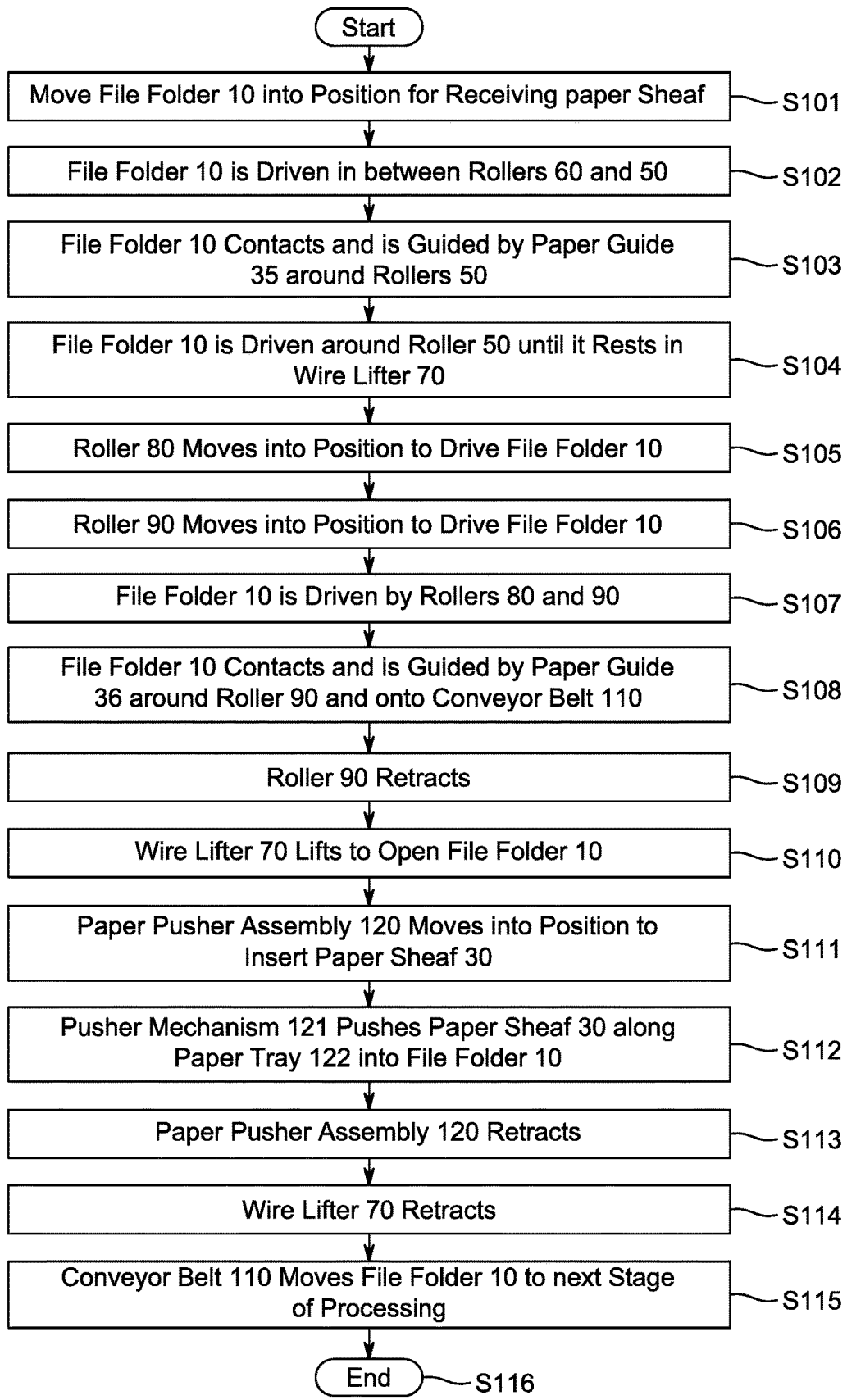
FIG. 15 shows a flowchart of a method for opening a file folder for receiving a sheaf of papers in one embodiment of the disclosure.

FIG. 15 is a flow chart of a foldering process according to one embodiment of the disclosure. The process starts at step 100 and in step 101, file folder 10 is moved into a starting position for processing by the scanner or foldering system. This is an optional step, and may have been performed prior to initiation the disclosed method.

Steps 102 through 109 describe an exemplary method of positioning and preparing a file folder to be ready to receive a paper according to one embodiment of the disclosure. As discussed above with regard to FIGS. 2-6, this could be performed in a variety of methods. For example, the number, size, orientation, and application of rollers and paper guides can be adjusted to accommodate system design requirements, including cost, space, size, and speed.

In step 102, file folder 10 is driven by the rotation of roller 50 in between roller 50 and 60. In step 103, file folder 10 contacts paper guide 35 and is thereby guided by paper guide 35 around roller 50, which is still driving file folder 10.

In step 104, file folder 10 is further driven by roller 50 and guided by paper guide 35 until it rests on folder lifter 70.

In steps 105 and 106, rollers 80 and 90 move into position to further drive file folder 10 into position for receiving paper sheaf 30. The order of these steps may change depending on system specifications. Similarly, these steps may be optional as the position of the rollers may not need to change depending on system specifications.

In step 105, roller 80 moves into position to contact and drive filer folder 10, and in step 106, roller 90 moves into position to drive filer folder 10. Rollers 80 and 90 are configured to apply a force against one another sufficient to hold and move the file folder 10 between then.

In step 107, file folder 10 is driven by the rotation of rollers 80 and 90 toward paper guide 36. In step 108, file folder 10, still driven by the rotation of rollers 80 and 90, contacts paper guide 36, which guides file folder 10 around roller 90 and onto a conveyor belt 110.

In step 109, roller 90 retracts so as to not interfere with paper sheaf 30 being inserted in file folder 10. As with steps 106 and 107, this step may be optional as the position of the rollers may not need to change depending on system specifications.

In step 110, folder lifter 70 rises, lifting one side of file folder 10, thereby opening file folder 10. As discussed with regard to FIG. 10, it is also envisioned that file folder 10 could be opened by other means, or paper sheaf 30 could be inserted without opening file folder 10. Further, in some embodiments, the folder lifter 70 does not raise one side of the file folder 10 and simply remains stationary.

In step 111, paper pusher assembly 120, including paper sheaf 30, moves into position for inserting paper sheaf 30 into file folder 10. In step 112, pusher mechanism 121 of paper pusher assembly 120 pushes paper sheaf 30 along paper tray 122 into file folder 10. Next, in step 113, paper pusher assembly 120 retracts.

In step 114, folder lifter 70 retracts. As discussed with regard to FIG. 10, it is also envisioned that conveyor belt 110 could simply move file folder 10 away from folder lifter 70 such that the side of file folder 10 resting on folder lifter 70 is pulled off of folder lifter 70 and falls down such that file folder 10 is closed.

In step 115, conveyor belt 110 drives file folder 10 to the next stage of processing.

Figure 16:
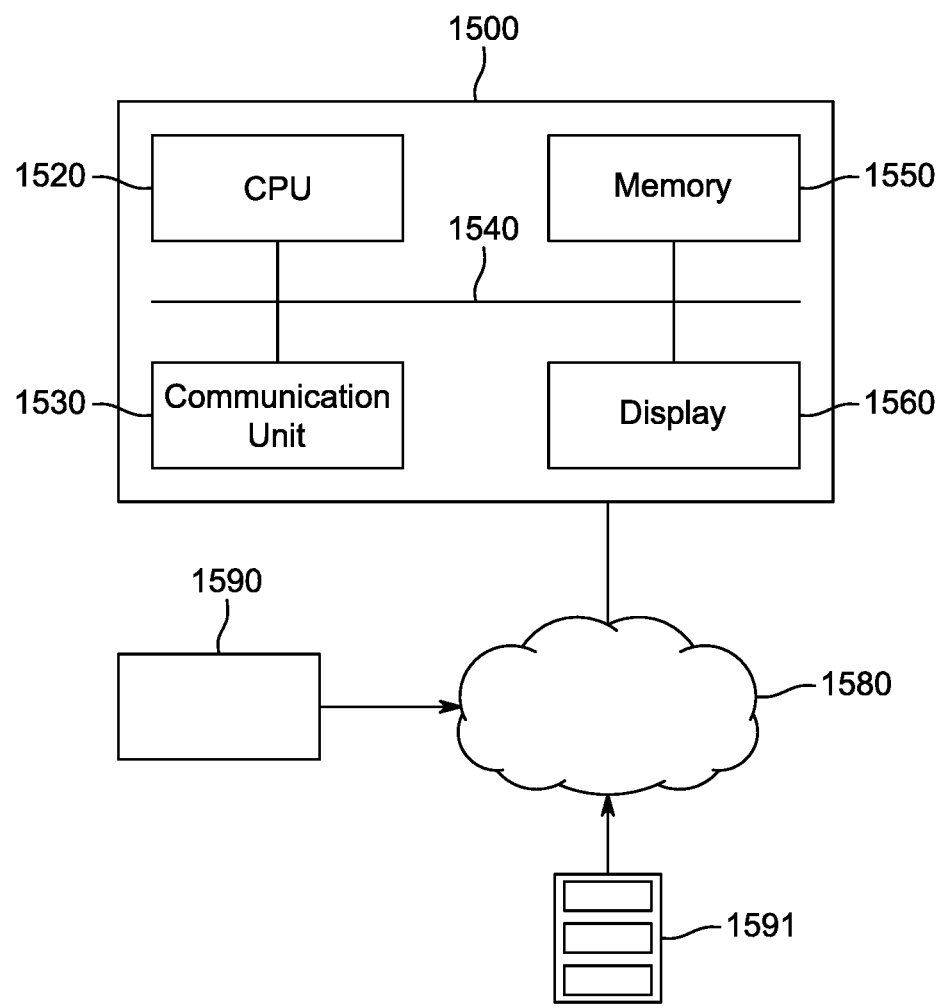
FIG. 16 shows a control circuit for controlling the apparatus for opening a file folder for receiving a sheaf of papers in one embodiment of the disclosure.

FIG. 16 illustrates an example of a control circuit 1500 that can be used in a scanner and used to control the disclosed system, according to an embodiment of the present disclosure. The control circuit can be implemented on a computer, or a scanner. The control circuit 1500 can control the scanner and elements of the disclosed system, including the rollers, folder lifter 70, conveyor belt 110, and paper pushing assembly 120.

The control circuit 1500 may be networked to another computing system 1590 via a network 1580, such as the Internet or a local area network (LAN). The control circuit 1500 can include a CPU 1520, memory 1550, communications unit 1530, display 1560, all connected via a bus 1540. It is noted that one or more control circuits 1500 can be used to implement various aspects of the disclosure.

The control circuit 1500 can be implemented by one or more scanner's, or various forms of digital computers, such as laptops, desktops, workstations, servers, blade servers, mainframes, and other appropriate computers. The components shown here, their connections and relationships, and their functions, are meant to be examples only, and are not meant to limit embodiments of the disclosure described and/or claimed in this document.

Each of the components of the control circuit 1500 are interconnected using various busses and may be mounted on a common circuit board or in other manners as appropriate. The central processing unit 1520 can process instructions for execution within the control circuit, including instructions stored in the memory or on the storage device to display graphical information on a display. In other embodiments, multiple processors and/or multiple buses may be used, as appropriate, along with multiple memories and types of memory. Also, multiple control circuits may be interconnected.

The central processing unit 1520 may be implemented as an integrated circuit that includes separate and/or multiple analog and digital processors. Additionally, the CPU may be implemented using any of several architectures. For example, the processor may be an x86 processor, RISC (reduced instruction set computers) processor. The processor may coordinate with the other components of the device, such as control of user interfaces, applications run by the device, and wireless communication. Multiple processors or processors with multiple cores may also be used. The processor is primarily responsible for performing the functions discussed in this document, however, a GPU may also be used.

The processor may communicate with a user through a control interface and display interface coupled to a display. The display may be, for example, an LCD (liquid crystal display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

Input to the control circuit 1500 may be done with a personal computer, server, or other computing device 1590.

The CPU 1520 operates according to a program stored in memory 1550. The CPU 1520 controls the communication unit 1530 and the display 1560. The program may be provided through the network 1580 such as the Internet or provided by being stored in a computer-readable information storage medium such as a DVD-ROM or a USB memory.

The memory 1550 includes, for example, a memory device such as a RAM or a ROM and a hard disk drive. The memory 1550 stores the program. The memory also stores information or computational result input from each unit.

The communication unit 1530 can be a network card which is configured to communicate with other devices, such as a web server or other computers. The communication unit 1530 inputs information received from other devices into the CPU 1520 or the memory 1550 based on the control of the CPU 1520 and sends the information to other devices.

The bus 1540 is configured to send or receive data with the CPU 1520, memory 1550, the communication unit 1530, and the display 1560. For example, the CPU 1520 or memory 1550 is connected to the display 1560 through an expansion bus in the bus 1540.

The in-device memory can be composed of a DRAM. The in-device memory is connected to the CPU 1520 and the memory 1550 through the bus 1540. The high-speed memory is composed of, for example, a SRAM that is capable of higher speed access than the in-device memory.

The control circuit 1500, which controls a scanner, can be part of a document processing system. For example, documents which were contained in folders and which a user wishes to re-folder, can be input into the scanner, and the documents can be scanned/digitized and saved to an internal memory 1550 or external memory 1591. Then physical documents can then be re-foldered. The digitized documents, once stored in memory, could be processed or manipulated in any number of ways.

An example of an external memory 1591 could be another computer/server which is connected to the scanner directly or through a network. Further, the external memory 1591 could be cloud storage, for example. While FIG. 10 shows the external memory 1591 connected to the control circuit 1500 through network 1580, the external memory 1591 could also be directly connected to the control circuit 1500.

The document processing system could intake reams of documents, which could include foldered documents, and scan each document and re-folder each document, without needing a human being to assist in the process. The system could be used to digitize hospital records, for example.

What is claimed is:

1. A scanner folder-handling-equipped for readying a file folder for replacement of a document sheaf into the file folder, the scanner comprising:
   a frame;
   a pair of first and second rollers carried on respective roller arms mounted on the frame, the first roller arm being shiftable onto the opened-out inner side of an essentially flat file folder, where the first roller is disposed spaced apart from the second roller to an extent predetermined to allow the first and second rollers to apply pressure to a file folder fed between them;
   a first paper guide attached to the frame, folder-feed downstream of the pair of first and second rollers, for bending the file folder around the second roller, along the file-folder hinge;
   a pair of third and fourth rollers carried on respective roller arms mounted on the frame, folder-feed downstream of the pair of first and second rollers, the third roller arm being shiftable onto the opened-out outer side of file folder, as fed from the first paper guide by the pair of first and second rollers, where the third roller is disposed spaced apart from the fourth roller to an extent predetermined to allow the third and fourth rollers to apply pressure to a file folder fed between them, and the arm carrying the fourth roller being retractable;
   a second paper guide disposed opposing the first paper guide and attached to the frame folder-feed downstream of the pair of third and fourth rollers, for bending the file folder around the fourth roller, along the file-folder hinge;
   a folder lifter vertically shiftably attached to the frame and disposed between the first and second paper guides;
   a conveyor belt attached to the frame and disposed beneath the pair of first and second rollers, the pair of third and fourth rollers, and the first and second paper guides;
   a roller movement assembly for rotationally driving the pair of first and second rollers and the pair of third and fourth rollers, and for operating the roller arms respectively carrying the rollers; and
   a control circuit configured to control the scanner, the roller movement assembly, and the folder lifter; wherein
   the control circuit operates the roller movement assembly to cause the pair of first and second rollers to feed the file folder toward the first paper guide;
   the first paper guide is of conformation for guiding a file folder from the pair of first and second rollers toward the pair of third and fourth rollers;
   the control circuit operates the folder lifter so that a file folder fed from the first paper guide is guided onto the folder lifter;
   the control circuit operates the roller movement assembly to cause the pair of third and fourth rollers to feed the file folder toward the second paper guide; and
   the second paper guide is of conformation for guiding the file folder bent around the fourth roller to position the folder-feed leading side of the file folder between the fourth roller and the conveyor belt.

2. The scanner according to claim 1, wherein the control circuit operates the folder lifter to cause the folder lifter to lift the folder-feed trailing side of the file folder so that the bent-over file folder is open and can receive a sheaf of papers, and operates the roller movement assembly to cause the roller arm carrying the fourth roller to retract so as to remove the fourth roller from the folded-over file folder.

3. The scanner according to claim 2, further comprising a paper pusher assembly configured to push a sheaf of papers into the bent over file folder with its folder-feed trailing side on the conveyor belt and its folder-feed trailing side lifted by the folder lifter.

4. The scanner according to claim 3, wherein the control circuit is configured to move a belt of the conveyor belt in a direction away from the folder lifter, after the sheaf of papers has been pushed in the file folder.

5. The scanner according to claim 4, wherein the roller arm carrying the fourth roller is configured to retract laterally in order to remove itself from inside of a file folder.

6. The scanner according to claim 5, wherein the folder lifter comprises:
   a first and second piston assembly; and
   a wire extending between the first and second piston assembly.

7. The scanner according to claim 5, wherein the folder lifter comprises:
   a first and second piston assembly;
   a first paddle configured to support a file folder; and
   a second paddle configured to be placed underneath a file folder; wherein
   the first paddle is attached to a proximal end of the first piston assembly and the second paddle is attached to a proximal end of the second piston assembly.

8. The scanner according to claim 1, further comprising:
   a fifth roller, a sixth roller, a seventh roller and an eight roller, wherein
   the fifth roller, the sixth roller, the seventh roller and the eighth roller, are paired with the first roller, the second roller, the third roller, and the fourth roller respectively.

9. The scanner according to claim 1, wherein the folder lifter comprises:
   a first moveable arm and a second movable arm configured to be spaced apart from one another so that a file folder can fit in between them, the first and second movable arms being configured to move up and down by movement means; and
   a supporting structure located toward proximal ends of the first moveable arm and second moveable arm is configured to hold the file folder.

10. The scanner according to claim 9, wherein:
    the first and second moveable arms are pistons; and
    the supporting structure is a wire connected between the first moveable arm and the second moveable arm.

11. The scanner according to claim 10, wherein the first moveable arm and the second moveable arm are configured to retract at a same time and rate, so that a file folder can be lifted evenly.

12. The scanner according to claim 9, wherein the supporting structure is a set of two paddles, a first paddle being attached to the first moveable arm and a second paddle being attached to the second moveable arm, the first and second paddles being configured to fold so that they become coplanar with the file folder.

13. The scanner according to claim 12, wherein the first moveable arm and the second moveable arm are configured to retract at a same time and rate so that a file folder can be lifted evenly.

14. In scanner folder-handling-equipped for readying a file folder for replacement of a document sheaf into the file folder, the scanner comprising a frame, a pair of first and second rollers carried on respective roller arms mounted on the frame, the first roller arm being shiftable onto the opened-out inner side of an essentially flat file folder, where the first roller is disposed spaced apart from the second roller to an extent predetermined to allow the first and second rollers to apply pressure to a file folder fed between them, a first paper guide attached to the frame, folder-feed downstream of the pair of first and second rollers, for bending the file folder around the second roller, along the file-folder hinge, a pair of third and fourth rollers carried on respective roller arms mounted on the frame, folder-feed downstream of the pair of first and second rollers, the third roller arm being shiftable onto the opened-out outer side of file folder, as fed from the first paper guide by the pair of first and second rollers, where the third roller is disposed spaced apart from the fourth roller to an extent predetermined to allow the third and fourth rollers to apply pressure to a file folder fed between them, and the arm carrying the fourth roller being retractable, a second paper guide disposed opposing the first paper guide and attached to the frame folder-feed downstream of the pair of third and fourth rollers, for bending the file folder around the fourth roller, along the file-folder hinge, a folder lifter vertically shiftably attached to the frame and disposed between the first and second paper guides, a conveyor belt attached to the frame and disposed beneath the pair of first and second rollers, the pair of third and fourth rollers, and the first and second paper guides, and a roller movement assembly for rotationally driving the pair of first and second rollers and the pair of third and fourth rollers, and for operating the roller arms respectively carrying the rollers, a method of inserting a sheaf of papers into a file folder, comprising:

driving the file folder into the first paper guide by holding the file folder between the first and second rollers and rotating the first roller, to drive the file folder against the first paper guide and guide the file folder around the first roller and onto the folder lifter;

driving the file folder into the second paper guide by holding the file folder between the third and fourth rollers and using the third and forth rollers to drive the file folder against the second paper guide and guide the file folder around the third roller and onto the conveyor belt, to close the file folder onto itself, forming a mouth;

retracting the third roller to expose the mouth of the file folder; and inserting the sheaf of papers into the file folder with a paper pushing assembly.

15. The method according to claim 14, further comprising retracting the folder lifter when the file folder is resting on the folder lifter.

16. The method according to claim 15, further comprising rotating the conveyor belt after the sheaf of papers is placed in the file folder to move the folder-feed trailing side of the file folder off of the folder lifter.

17. The method according to claim 16, further comprising retracting the paper pusher assembly after the sheaf of papers has been inserted into the file folder.

18. The method according to claim 15, wherein the folder lifter is retracted before the sheaf of papers is inserted into the file folder.

19. The method according to claim 18, further comprising lowering the folder lifter to receive a subsequent file folder.

\* \* \* \* \*